F. W. MARTIN.
AXLE LUBRICATOR.
APPLICATION FILED AUG. 24, 1912.
1,056,568.
Patented Mar. 18, 1913.
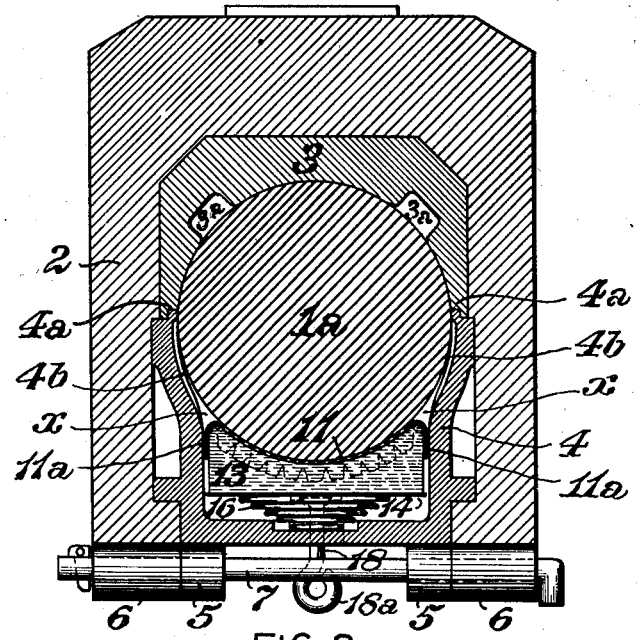
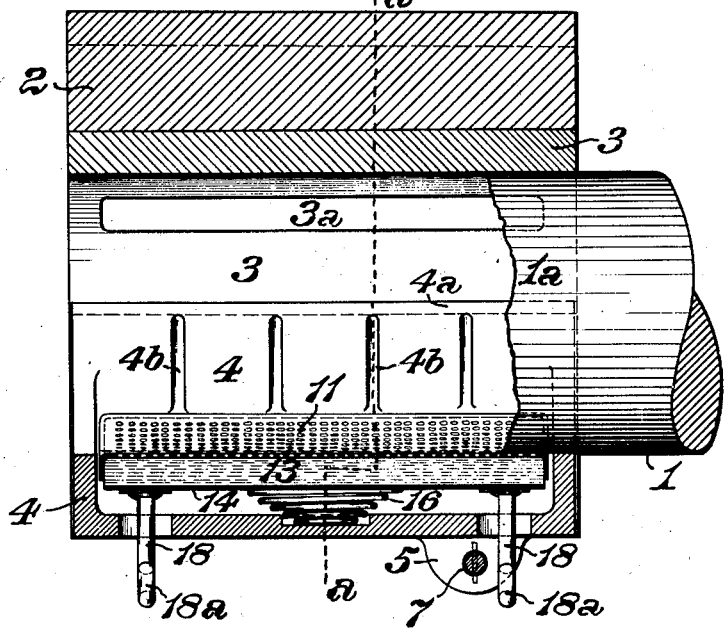
WITNESSES
INVENTOR
Frederick W. Martin,

UNITED STATES PATENT OFFICE.

FREDERICK W. MARTIN, OF NEW YORK, N. Y.

AXLE-LUBRICATOR.

1,056,568. Specification of Letters Patent. Patented Mar. 18, 1913.

Application filed August 24, 1912. Serial No. 716,797.

*To all whom it may concern:*

Be it known that I, FREDERICK W. MARTIN, of the borough of Manhattan, in the city, county, and State of New York, have invented a certain new and useful Improvement in Axle-Lubricators, of which improvement the following is a specification.

My invention relates to axle lubricators of the class or type in which a body of solid lubricant is held in proximity to an axle journal, and adjoining portions thereof successively and continuously fed to the journal by the action of the latter thereon in its rotation, an instance of which is exemplified in Letters Patent Reissue No. 12134, granted and issued to A. G. Elvin, under date of July 21, 1903.

The object of my invention is to provide an axle lubricator of such type which shall be of simple and inexpensive construction, and specially adapted for application in the journal boxes of locomotive trailing trucks, and in the operation of which the lubricant will be thoroughly and uniformly distributed over the surface of the journal.

The improvement claimed is hereinafter fully set forth.

In the accompanying drawings: Figure 1 is a transverse section through an axle box illustrating an application of my invention, on the line $a\ a$ of Fig. 2; and, Fig. 2, a longitudinal central section through the same.

My invention is herein exemplified as applied in connection with a journal box, 2, which is adapted to be supported on the journal, $1^a$, of a locomotive axle, 1, and is, as usual, provided with an upper brass bearing, 3, and lower lubricant cellar, 4, the latter having integral downwardly projecting lugs, 5, fitting between lugs, 6, on the bottom of the journal box, the lugs being connected by a rod, 7, passing through eyes in the lugs, 5 and 6. It will be understood that the cellar, 4, is an element of the journal box constructions now in use, in which cotton waste soaked with lubricating oil is usually placed for the purpose of lubricating the journal. Longitudinal grooves, $3^a$, are formed in the bearing, 3, and longitudinal projections, $4^a$, which extend above the axial line of the journal are formed on the top of the cellar, 4, said projections fitting in corresponding longitudinal grooves on the bottom of the bearing, 3. The bearing and cellar are bored out together, so as to fit truly on the journal, at their joints, and the cellar is narrowed below the axial line of the journal, its inner sides being curved inwardly for some distance, and thereafter relieved or curved outwardly from the journal, so that longitudinal spaces, $x$, of substantially triangular section, may be presented on opposite sides of the journal, for the purpose of providing channels for the passage of the lubricant, as hereinafter explained. Vertically extending grooves, $4^b$, are formed in the inner surfaces of the cellar, adjacent to the journal, $1^a$.

A perforated lubricant delivery plate, 11, having lateral flanges, $11^a$, is fitted freely in the cellar, 4, said plate being curved in correspondence with, and contacting with, the periphery of the journal, $1^a$. The curved portions of the plate, 11, at its junction with the flanges, $11^a$, form the lower boundaries of the spaces, $x$, before referred to, and the ends of the plate are turned downwardly, as shown in Fig. 2.

A follower plate, 14, is fitted in the cellar, below the lubricant delivery plate, 11, and is pressed upwardly toward the latter by a spring, 16, which is interposed between its lower side and the bottom of the cellar. The space between the plates, 11 and 14, is, in the operation of the appliance, filled up by a solid block of lubricating material, 13, which is continuously pressed up to and through the openings of the plate, 11, and thence to the adjoining periphery of the journal, by the follower plate, 14, and spring, 16. The degree of wear of the lubricant is shown by one or more indicator rods, 18, (two being shown in this instance), which are connected to the follower plate, 14, and pass freely through openings in the bottom of the cellar, 4, their lower ends being turned into eyes, $18^a$.

Difficulty has been encountered in the operation of lubricators of the type to which my invention relates, by reason of the trailing of the journal against the back of the bearing, which soon wears to a knife edge, scraping the lubricant from the journal and preventing its effective supply to the bearing surface thereof. Under my invention, the bearing and cellar are, as before described, fitted together and bored out coincidently, so as to fit truly on the journal, and the lateral spaces, $x$, between the cellar and the journal, collect the lubricant which is fed through the perforations of the plate, 11, and deliver it to the upwardly extending grooves, 4$^b$, from which, by the revolutions of the journal, it is delivered throughout the bearing surface thereof.

I claim as my invention and desire to secure by Letters Patent:

1. In an axle lubricator, the combination, with an axle box and bearing, of a lubricant cellar abutting against the bearing and bored out concentrically therewith below its axial line, the walls of said cellar being outwardly curved or relieved below its bored out portion, and thence extending downwardly at a distance apart less than the bored diameter, and means for feeding lubricating material to the spaces adjoining the curved portions of the walls of the cellar.

2. In an axle lubricator, the combination, with an axle box and bearing, of a lubricant cellar abutting against the bearing and bored out concentrically therewith below its axial line, said cellar being of less inside width below its bored out portion than the bored diameter, a perforated lubricant delivery plate fitting in the narrower portion of the lubricant cellar, a follower plate fitting the cellar below the lubricant delivery plate, and a spring interposed between and bearing on the bottom of the cellar and the lower side of the lubricant delivery plate.

3. In an axle lubricator, the combination, with an axle box and bearing, of a lubricant cellar abutting against the bearing and bored out concentrically therewith below its axial line, the walls of said cellar being outwardly curved or relieved below its bored out portion, and thence extending downwardly at a distance apart less than the bored diameter, a perforated lubricant delivery plate fitting in the narrower portion of the lubricant cellar, a follower plate fitting the cellar below the lubricant delivery plate, and a spring interposed between and bearing on the bottom of the cellar and the lower side of the lubricant delivery plate.

4. In an axle lubricator, the combination, with an axle box and bearing, of a lubricant cellar abutting against the bearing and bored out concentrically therewith below its axial line, said cellar being of less inside width below its bored out portion than the bored diameter, a perforated lubricant delivery plate having depending lateral flanges fitting in the narrower portion of the lubricant cellar, the portions of said plate at and adjoining its junction with the flanges forming the lower boundaries of lateral passages between the curved portions of the walls of the cellar and an axle journal, when applied in operation, a follower plate fitting the cellar below the lubricant delivery plate, and a spring interposed between and bearing on the bottom of the cellar and the lower side of the lubricant delivery plate.

5. In an axle lubricator, the combination, with an axle box and bearing, of a lubricant cellar abutting against the bearing and bored out concentrically therewith below its axial line, said cellar being of less inside width below its bored out portion than the bored diameter and having a plurality of vertically extending grooves in the curved portions of its side walls, a perforated lubricant delivery plate fitting in the narrower portion of the lubricant cellar, a follower plate fitting the cellar below the lubricant delivery plate, and a spring interposed between and bearing on the bottom of the cellar and the lower side of the lubricant delivery plate.

6. In an axle lubricator, the combination, with an axle box, of a journal bearing having longitudinally extending grooves in its concave surface, a lubricant cellar abutting against and bored out concentrically with the journal bearing below its axial line, said cellar being of less inside width below its bored out portion than the bored diameter and having a plurality of vertically extending grooves in the curved portions of its side walls, a perforated lubricant delivery plate fitting in the narrower portion of the lubricant cellar, a follower plate fitting the cellar below the lubricant delivery plate, and a spring interposed between and bearing on the bottom of the cellar and the lower side of the lubricant delivery plate.

FREDERICK W. MARTIN.

Witnesses:
J. SNOWDEN BELL,
WM. T. LANE,